June 28, 1960
F. M. MAYES
2,942,473
PRESSURE MEASURING APPARATUS
Filed Feb. 4, 1958
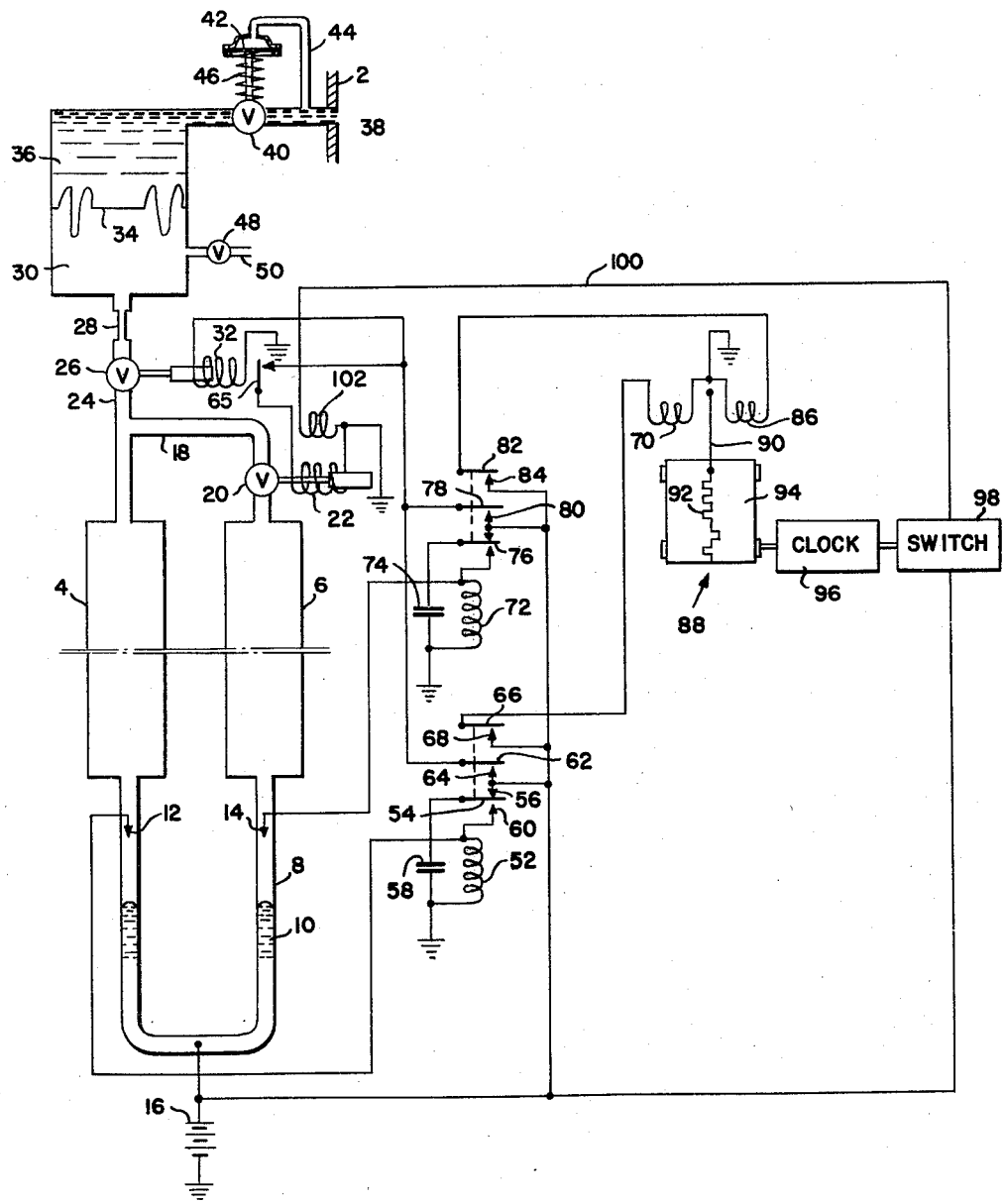
INVENTOR.
FRED M. MAYES
BY
ATTORNEYS

United States Patent Office 2,942,473
Patented June 28, 1960

2,942,473

PRESSURE MEASURING APPARATUS

Fred M. Mayes, Richardson, Tex., assignor to Sun Oil Company, Philadelphia, Pa., a corporation of New Jersey Filed Feb. 4, 1958, Ser. No. 713,134

10 Claims. (Cl. 73—388)

This invention relates to pressure measuring apparatus particularly designed for the measurement of small pressure changes where conditions of high pressure are involved.

It is sometimes required that small pressure changes be measured, which changes are only very small fractions of existing pressures. As an example of this there may be cited studies of oil reservoirs wherein it is desirable to measure pressure changes at one well which result from pressure changes induced in other wells in the same reservoir. This procedure permits calculations of important parameters of the reservoir rock between the wells. Generally speaking, such induced pressure changes are quite small, and they must be measured under typical bottom hole conditions of extremely high ambient pressures. Changes of pressure over extended periods of time, in such cases, are informative, and it is accordingly necessary to provide recording apparatus which will serve to indicate the pressure changes over extended periods. For such purposes it is desired to provide an apparatus which may be entirely located at the bottom of a hole, being lowered in the hole on a wire line, with continuous automatic operation throughout a long period of measurement.

In accordance with the present invention, an apparatus satisfactory for the purposes outlined is provided. In brief, as pressure changes occur, these are reflected in small incremental steps of pressure change, which steps are of definite amount, and the number of steps involved are recorded or counted. Both increases and decreases of pressure are recorded and distinguished, so that a time history of pressure changes may be secured.

As will become evident hereafter, the invention is applicable to uses other than of the type just described by way of example. The apparatus may be used under both high and low pressure conditions and even, if desired, not only to measure small pressure changes but large ones as well.

The objects of the invention have to do with the attainment of the general results indicated above, and will become more apparent from the following description read in conjunction with accompanying drawing which is a mechanical and electrical diagram showing the essential parts of the apparatus.

The apparatus will be described with particular reference to its use for measuring relatively small pressure changes in wells in which large pressures are encountered. It will then become obvious how the apparatus may be modified, generally with simplification, to adapt it for other uses.

For use in bore holes it is desirable that the apparatus should be self-contained and automatically operating so that it may be encompassed in a casing capable of withstanding high external pressures and adapted to be lowered on a wire line without necessitating electrical connections to the surface, a source of operating power being provided in the casing. The general form of casing used may be that conventionally provided for bore hole measuring apparatus and is accordingly only indicated at 2. Within this casing there are located all of the elements shown in the figure.

These elements comprise a pair of chambers 4 and 6 which may, in fact, have various sizes depending upon the particular types of operations which are desired. For consistency of description it may be initially assumed that these are chambers of substantial volume containing a compressible gas such as air. These chambers are interconnected by a manometer tube 8 containing mercury or other conductive liquid, such as an aqueous electrolyte, the level of liquid in the two legs of the tube being normally below a pair of contacts 12 and 14, there being connected to the conductive liquid in the manometer the ungrounded terminal of a power supply indicated at 16 and which may conveniently be constituted by a battery which serves for the supply of power for all parts of the apparatus. The cross-section of the manometer tube should be small so that its volume is negligible in comparison with the volumes of the chambers 4 and 6.

A pressure equalizing connection 18 is provided between the chambers 4 and 6 and is controlled by a valve 20 operated by a solenoid 22, the valve being closed when the solenoid is deenergized and open when it is energized. The normal condition of the valve is closed.

A passage 24 provides communication between chamber 4 and a chamber 30 through a valve 26 and a restriction 28. The valve 26 is solenoid controlled and is normally open but closed upon energization of the solenoid 32. Desirably valve 26 is, relatively to valve 20, slow operating in both opening and closing. The flow restriction 28 is such as to prevent rapid flow of fluid between the chambers 4 and 30. If desired this may be made adjustable in the form of a needle valve, or the like. The chamber 30 is closed, in part, by a diaphragm 34 which is desirably of the slack type offering negligible stiffness to displacement. This diaphragm 34 is to act merely as a separator between the fluid in the chamber 30 and liquid in a chamber 36, which liquid may be well fluid and consequently may contain dirt which it is desirable to keep out of the chambers 4 and 6 and their connections. Furthermore, if, as here initially described, the fluid in chambers 4, 6 and 30 is a gas, the diaphragm provides a well-defined interface. The chamber 36 has communication with the exterior of the casing through a passage 38 which may be controlled by a valve 40 which is controlled, in turn, by a diaphragm 42 to which pressure is applied through connection 44 from the well liquid. A spring 46, desirably adjustable, normally holds the valve 40 closed till the pressure introduced at 44 exceeds some predetermined amount, which amount may be approximately but less than the minimum pressure which is expected to be encountered in the operation of the device. As will hereafter appear, this aids in initially setting the device for operation and avoidance of unnecessary operations. The chamber 30 is provided with a connection 50 controlled by a shut-off valve 48 for the initial introduction of compressed gas.

The winding of a relay 52 is connected between ground and the contact 12 in one leg of the manometer, as shown, the leg connected to the chamber 4. The relay has a number of movable contacts. One of these, indicated at 54, engages a contact point 56 when the relay is deenergized to connect between the ungrounded terminal of battery 16 and ground a capacitor 58. When the relay is energized contact is made at 60, and after energizing contact in the manometer at 12 is broken, the capacitor 58 will discharge through the relay winding to maintain the relay energized for a suitable delay period.

A second movable contact 62 engages a point 64 when the relay 52 is energized to provide current from battery 16 to the solenoids 22 and 32 of the respective valves 20 and 26, to open the former and close the latter, the connection to solenoid 22 being through switch 65 which is closed only when the plunger in solenoid 32 effects closure of valve 26. Thus proper sequential actions of valves 26 and 20 occur as described hereafter. A third movable contact 66 of relay 52 is arranged to engage a point 68 when the relay is energized to provide current through a galvanometer winding 70 which will be more fully described hereafter.

A second relay 72 which corresponds to the relay 52 has the ungrounded end of its winding connected to the contact 14 in the manometer leg which is connected to chamber 6. Associated with relay 72 is a capacitor 74 which through the action of movable contact 76 has the same delay function as the capacitor 58 previously described. Movable contact 78 engages contact point 80 when relay 72 is energized to provide energization of the solenoid windings 22 and 32. Movable contact 82 of relay 72 engages point 84 when the relay is energized to provide current through the galvanometer winding 86.

At 88 there is indicated a recording galvanometer which comprises a stylus 90 deflected to the left when the winding 70 is energized and to the right when winding 86 is energized thereby to provide a trace 92 on a record sheet 94 which is driven by clockwork mechanism 96. The sheet 94 may contain time markings (not shown) so that with proper presetting and notation of times there will be correlation of markings made by the stylus 90 with events occurring or provided at the surface, for example, injections of liquids to build up well pressures, or the like. The clock mechanism may be mechanically driven or may be electrically driven from the battery 16.

The clock 96 also desirably controls a switch 98 arranged to make contact so that through a connection 100 there may be at proper times energized a second winding 102 concentric with solenoid 22 to open the valve 20. The switch 98 more elaborately may also control the circuit of solenoid 32 or control various other parts of the circuit to either delay or initiate operations. Such auxiliary controls are quite arbitrary and dependent upon the type of operation desired.

Assuming that pressure changes are to be measured in a well containing liquid, for example, such as may be produced by pressure changes in some other well in the same reservoir, operation may proceed as follows:

Water may be introduced in the chamber 36 with the diaphragm 34 located in its position providing a maximum volume for the chamber 30. With valve 40 closed, and with valves 20 and 26 held open, compressed air may be supplied through connection 50 and open valve 48 to build up in chambers 30, 4 and 6 and their connections a pressure which may be approximately, but somewhat less than, the minimum pressure which is expected to be encountered at the position of measurement during a measuring period. Valve 48 is then shut to close chamber 30. Electrical connections may then be established through a main control switch (not shown), whereby switch 98 will hold open valve 20 the clock drive started, with notation of the time indications and the protective casing 2 closed whereupon the apparatus may be lowered into the hole by a wire line.

During the initial part of the descent, the external pressure will be less than that existing in the system and valve 40 will remain closed to prevent any loss of pressure or operation. When a depth is encountered at which the external pressure exceeds that within the system and the pressure is sufficient to open the valve 40, the pressure then applied in the chamber 36 will correspond to the ambient pressure in the well. At this time, the clock 96 will continue control of the switch 98 to energize solenoid 102 to maintain valve 20 open, thereby insuring continuous substantial equality of pressures in chambers 4 and 6. As the pressure continues to increase during the descent of the apparatus, diaphragm 34 will be displaced downwardly producing flow of the compressed air from chamber 30 through the connection 24 and also through the equalizing connection 18 into chambers 4 and 6. If restriction 28 is sufficient, the pressures in chambers 4 and 6 will then be substantially continuously equal and no change of liquid level in the manometer will occur. If the initial setting of switch 98 is correct, the desired level at which measurements are to be made will be attained before switch 98 is opened. Finally, when switch 98 is opened, valve 20 will close and the apparatus is then in condition for automatic recording of pressure changes. It will be after this time that manipulations will normally be made which might induce pressure changes in the well.

Assume, now, that the pressure in the well increases. This increase may occur at either a low rate or rapid rate. In the latter case, however, the restriction to flow offered at 28 prevents a rapid flow of air into chamber 4 and a cycle of operation will be as follows:

As the pressure increases in chamber 4, the liquid 10 will rise in the right hand manometer leg until the liquid level engages the contact 14. The pressure rise for effecting this will, under the conditions already indicated, correspond to the head of the liquid 10 between its initial level and that providing contact at 14. The pressure changes corresponding to this may be quite small, for example, 0.1 pound per square inch. The making of contact at 14 energizes the relay 72 and movable contact 78 will produce energization of solenoids 22 and 32. Valve 26 is thereby closed and valve 20 opened. Because of the provision of switch 65 valve 26 is closed just slightly before valve 20 opens. The same switch insures that valve 26 will reopen slightly after valve 20 closes valve 26 being relatively slow acting as mentioned above. However, with sufficient restriction at 28 this sequence control is generally unnecessary and the operations of the valves may be simultaneous without the introduction of any substantial errors, since the by-pass connection 18 may be such as to offer quite free interchange of gas between chambers 4 and 6.

With the closure of valve 26, no further flow of gas takes place from chamber 30. With the opening of valve 20 equalization of pressure in chambers 4 and 6 rapidly occurs and the liquid in the manometer is again restored to the condition of the same level in both legs. In order to maintain the valve 20 open for a sufficient short interval to insure complete equalization, the capacitor 74 comes into play, discharging through winding 72 when contact is broken at 14. The delay in deenergization of relay 72 may, of course, be quite short.

With deenergization of the solenoids, the valves are restored to their initial positions, 26 being opened, and 20 closed. If the pressure in chamber 4 continues to increase due to higher pressure in chamber 30, the cycle just described is repeated until the pressure increase ceases, which is reflected in the fact that contact is not made at 14.

In the case of a pressure decrease, the manometer liquid movement is in the opposite direction, the pressure in chamber 6 exceeding that in chamber 4, so that electrical contact is made at 12 with energization of relay 52. The same cycle then occurs due to this relay, but with fluid flows reversed, until the pressure in chamber 6 is essentially that in chamber 30.

It may be noted that calibration is required involving the relation between the volumes of chambers 4 and 6 and the manometer constant and in some cases the volume change introduced by the manometer operation. For example, assuming that the volumes of chambers 4 and 6 are equal and the manometer is set to close contacts at a 0.1 pound per square inch differential pressure, the volume of the manometer being assumed negligible, at the first 0.1 pound per square inch change in a direction of increase of pressure contact at 14 will close, but in view of the shutting of valve 26 and the equality of the chamber volumes the pressure will equalize at a value 0.05 pound per square inch below the pressure in chamber 30. When the valve 20 is closed and 26 is opened, the pressure in chamber 4 will again rise to the pressure in chamber 30, and due solely to this the manometer would indicate a pressure difference of 0.05 pound per square inch. A pressure change of only 0.05 pound per square inch will then be required to close the contact 14 if the change is in the same direction. Each succeeding pressure change of 0.05 pound in the same direction will produce contact closure and pressure equalization. However, when the direction of pressure change reverses, the first closure will require a change of 0.15 pound per square inch. This situation may be taken care of in the calibration and interpretation of the record. Compressibility of gas or liquid is also a factor and the change of volume due to the manometer may have to be taken into account. All of these factors depend on the constants of the apparatus.

The only difference between the relays is that relay 52 energizes the galvanometer winding 70, whereas relay 72 energizes the galvanometer winding 86. Accordingly, for a step of pressure increase the stylus 90 moves to the right to produce a pulse on the record while in the case of a pressure decrease it moves to the left to produce a pulse.

As will be evident from the foregoing, each pulse either to the right or left represents a corresponding incremental pressure change which is of an amount determined by the constants of the apparatus and the sequence of pressure changes, the sequence determining the pressure increment to be assigned to a pulse as discussed above. The increment depends, of course, upon the rise of manometer liquid from its normal level to contact at 12 or 14. By the actions of valve 26, pressure changes in chamber 30 are reflected in these increments which add up to the total pressure change involved. The result is that counting of the pulses of the record 92, adding the number to the right and subtracting the number to the left, and taking into account the senses of pressure changes, will give the history of pressure changes. These pulses may be actually counted or, if desired, may be scanned and automatically counted to provide a record of pressure changes in the well with respect to time. In the use described the pressure changes in the well will generally be relatively slow whereas the periods of cycles of operation will be quite short so that a practically continuous record is obtained with errors not exceeding the increment corresponding to a single cycle.

It will be evident from the foregoing that quite small pressure differences may be thus recorded against the background of an ambient pressure which may be extremely high.

It will be noted, furthermore, that despite the high ambient pressures the pressure differences existing across the valves during operation are always relatively small so that valve leakage is a negligible factor.

It will be noted that, if desired, not only small variations but very large variations in pressure may be measured, for example, the cumulative pressure increase encountered from a position near or at the surface to the bottom of a hole. Under such conditions, however, volumetric considerations would indicate the desirability of using a somewhat compressible liquid rather than a gas in the chambers 30, 4 and 6. Liquid hydrocarbons may thus be used since they have compressibilities several times that of water. Under such conditions it will be likely that it will not be desired to measure small pressure increments, but rather relatively large ones, and in such case the manometer would be replaced by a pressure operated switch which might require a pressure increment of, for example, ten pounds per square inch for each operation.

It will be noted that power is consumed in this apparatus only during operations of the valves. For this reason, and because of the simplicity of the recording apparatus, the apparatus is adapted for use as a self-recording wire line tool to operate for long periods of time on self-contained batteries. Recording may be magnetic in which case recording heads may replace the solenoids 70 and 86.

The apparatus, in view of the use of compressible fluids is, in one sense, quite sensitive to temperature changes. However, it may normally be expected that at the bottom of a well bore after an initial period of temperature stabilization subsequent temperature changes would be quite small, and hence for making records of small pressure changes as described above, temperature need not be taken into account. Temperature changes, however, may be recorded on the chart 94, and corrections made. Temperature compensation may also be provided by making chamber 6 of metal having considerable expansibility with temperature and filling a considerable part of its volume with quartz or other material having a very low temperature coefficient, thereby compensating for the temperature coefficient of the fluid used for operation. Other types of compensation may, of course, be used.

It may also be noted that, whereas, in the case of use of a gas, the pressure increments are determined primarily by the distance of rise of manometer liquid, if a liquid is used as the operating fluid this may not be true but its compressibility and volumes involved may be the major factors determining the values of the pressure difference. In any event, however, the apparatus may be calibrated to determine what values are to be assigned to the increments. It is desirable for all types of operation that chambers such as 4, 6, 30 and 36 and all piping and valves should be externally exposed to well pressure to avoid leaks. This, may, of course, be effected by locating them in a chamber of the housing which is in communication with the external liquid. To secure measurements of actual ambient pressure, the initial filling of chambers 30, 4 and 6 by compressed gas may involve the attainment of some predetermined desired pressure, without the delay of operation described above as provided by switch 98. In such case the pressures will be given in terms of increments with respect to the initial pressure by counting pulses on the record as described above.

It may be noted that if the rate of pressure change expected is small compared to the rate at which the pressure in chamber 6 can be equalized with the pressure to be measured the chamber 4 may be reduced to nothing more than a connection between 24 and the left-hand leg of the manometer 8 and valve 26 could be omitted. It may also be noted that even the manometer might be omitted by adopting for valve 20 a check valve controlled by a small differential pressure across it with provision for holding it open for short intervals each time it is opened by a pressure difference. The number of operations of this valve could then be counted.

While the apparatus has been described particularly in conjunction with high pressures such as are encountered in bore holes, it will be evident that it is applicable to pressures in any range including very low pressures, and in the latter case the chambers may be initially evacuated.

It will be understood from the foregoing that the invention is not to be regarded as limited except as required by the following claims.

What is claimed is:

1. Apparatus for the measurement of pressure comprising a chamber, a passage providing flow of fluid to or from said chamber in dependence upon pressure to be measured, means for closing and opening said passage, means responsive to pressure differences between said chamber and said pressure to be measured, means controlled by said responsive means when such pressure difference reaches a predetermined value to effect a cycle of operation including opening of said closing means followed by closure thereof, and means for indicating the occurrence of each such cycle of operation.

2. Apparatus according to claim 1 in which separate responsive means are provided for changes of pressure above and below the pressure in said chamber, and in which said indicating means responds differently to cycles initiated by the separate responsive means.

3. Apparatus for the measurement of pressure comprising a chamber, a passage providing flow of fluid to or from said chamber in dependence upon pressure to be measured, means normally closing said passage and arranged to be opened in response to predetermined pressure differences between said chamber and said pressure to be measured and to be closed when said pressure difference approximates zero, and means for indicating the occurrence of each cycle of operation of the last mentioned means.

4. Apparatus according to claim 3 in which said closing means is opened in response to both positive and negative predetermined pressure differences between said chamber and said pressure to be measured, and in which said indicating means responds differently to cycles initiated, respectively, by positive and negative pressure differences.

5. Apparatus for the measurement of pressure comprising a pair of chambers, a passage providing flow of fluid to or from one of said chmabers in dependence upon pressure to be measured, means for closing said passage, a pressure equalizing connection between said chambers, means for closing said connection, means responsive to pressure differences between said chambers, means controlled by said responsive means when the pressure difference between said chambers reaches a predetermined value to effect a cycle of operation including closure of said passage by its closing means and opening of said equalizing connection by its closing means, and then closing of said equalizing connection by its closing means and opening of said passage by its closing means, and means for indicating the occurrence of each such cycle of operation.

6. Apparatus for the measurement of pressure comprising a pair of chambers, a passage providing flow of fluid to or from one of said chambers in dependence upon pressure to be measured, said passage including a restriction to flow to prevent rapid changes of pressure in the last mentioned chamber, means for closing said passage, a pressure equalizing connection between said chambers, means for closing said connection, means responsive to pressure differences between said chambers, means controlled by said responsive means when the pressure difference between said chambers reaches a predetermined value to effect a cycle of operation including closure of said passage by its closing means and opening of said equalizing connection by its closing means, and then closing of said equalizing connection by its closing means, and opening of said passage by its closing means, and means for indicating the occurrence of each such cycle of operation.

7. Apparatus for the measurement of pressure comprising a pair of chambers, a passage providing flow of fluid to or from one of said chambers in dependence upon pressure to be measured, means for closing said passage, a pressure equalizing connection between said chambers, means for closing said connection, means responsive to pressure differences between said chambers, means controlled by said responsive means when the pressure difference between said chambers reaches a predetermined value to effect a cycle of operation including closure of said passage by its closing means and opening of said equalizing connection by its closing means, and then closing of said equalizing connection by its closing means and opening of said passage by its closing means, and means for recording the occurrence of each such cycle of operation.

8. Apparatus according to claim 5 in which separate controlled means are provided for positive and negative pressure differences between said chambers to effect cycles of operation, and in which said indicating means responds differently to cycles initiated, respectively, by positive and negative pressure differences.

9. Apparatus according to claim 6 in which separate controlled means are provided for positive and negative pressure differences between said chambers to effect cycles of operation, and in which said indicating means responds differently to cycles initiated, respectively, by positive and negative pressure differences.

10. Apparatus according to claim 7 in which separate controlled means are provided for positive and negative pressure differences between said chambers to effect cycles of operation, and in which said indicating means responds differently to cycles initiated, respectively, by positive and negative pressure differences.

References Cited in the file of this patent
UNITED STATES PATENTS

| | | |
|---|---|---|
| 1,977,498 | Staegemann | Oct. 16, 1934 |
| 2,600,324 | Rappaport | June 10, 1952 |
| 2,669,873 | Gardner et al. | Feb. 23, 1954 |
| 2,701,854 | Carrick | Feb. 8, 1955 |
| 2,719,426 | Lamb et al. | Oct. 4, 1955 |